United States Patent [19]

Shotts et al.

[11] 4,128,928
[45] Dec. 12, 1978

[54] METHOD OF FORMING A CURVED TRAILING EDGE COOLING SLOT

[75] Inventors: L. D. Shotts, Forest Park; Raymond W. Wisbey, Sharonville; Albert W. Sears, Cincinnati, all of Ohio

[73] Assignee: General Electric Company, Cincinnati, Ohio

[21] Appl. No.: 755,264

[22] Filed: Dec. 29, 1976

[51] Int. Cl.² ............................................. B23P 15/02
[52] U.S. Cl. ........................ 29/156.8 B; 29/156.8 H; 72/341; 83/17; 83/176; 408/19
[58] Field of Search ............ 416/97; 29/156.8 B, 29/156.8 H, 557, 558, 157 C; 83/17, 176; 408/19; 72/341, 335

[56] References Cited

U.S. PATENT DOCUMENTS

| 2,375,518 | 5/1945 | Bolle | 83/176 |
|---|---|---|---|
| 2,787,049 | 4/1957 | Stalker | 29/156.8 |
| 3,026,605 | 3/1962 | Turner | 29/156.8 H |
| 3,230,613 | 1/1966 | Rechin et al. | 29/157 C |
| 3,572,960 | 3/1971 | McBride | 415/115 |
| 3,576,065 | 4/1971 | Frazier | 29/402 |
| 3,635,586 | 1/1972 | Kent et al. | 416/97 |
| 3,707,750 | 1/1973 | Klass | 29/156.8 B |
| 3,773,506 | 11/1973 | Larker et al. | 75/208 R |
| 3,819,295 | 6/1974 | Hauser et al. | 416/97 |
| 3,825,984 | 7/1974 | Linko et al. | 29/156.8 H |
| 3,842,480 | 10/1974 | Mikulski | 29/156.8 H |
| 3,921,271 | 11/1975 | Dennis et al. | 29/156.8 H |

FOREIGN PATENT DOCUMENTS

410961  5/1974  U.S.S.R. ...................................... 408/19

*Primary Examiner*—C. W. Lanham
*Assistant Examiner*—Daniel C. Crane
*Attorney, Agent, or Firm*—Dana F. Bigelow; Derek P. Lawrence

[57] ABSTRACT

A curved slot is formed between an internal cavity of an airfoil and the trailing edge thereof by temporarily deflecting the airfoil trailing edge portion toward the suction side thereof, forming a straight slot in the trailing edge portion while it is in the deflected position, and releasing the deflecting pressure to allow the trailing edge portion to spring back into an unstressed condition so as to thereby curve the slot within the trailing edge portion. Further curvatures may be effected by subsequent reformation of the trailing edge portion toward the pressure side of the airfoil.

8 Claims, 5 Drawing Figures

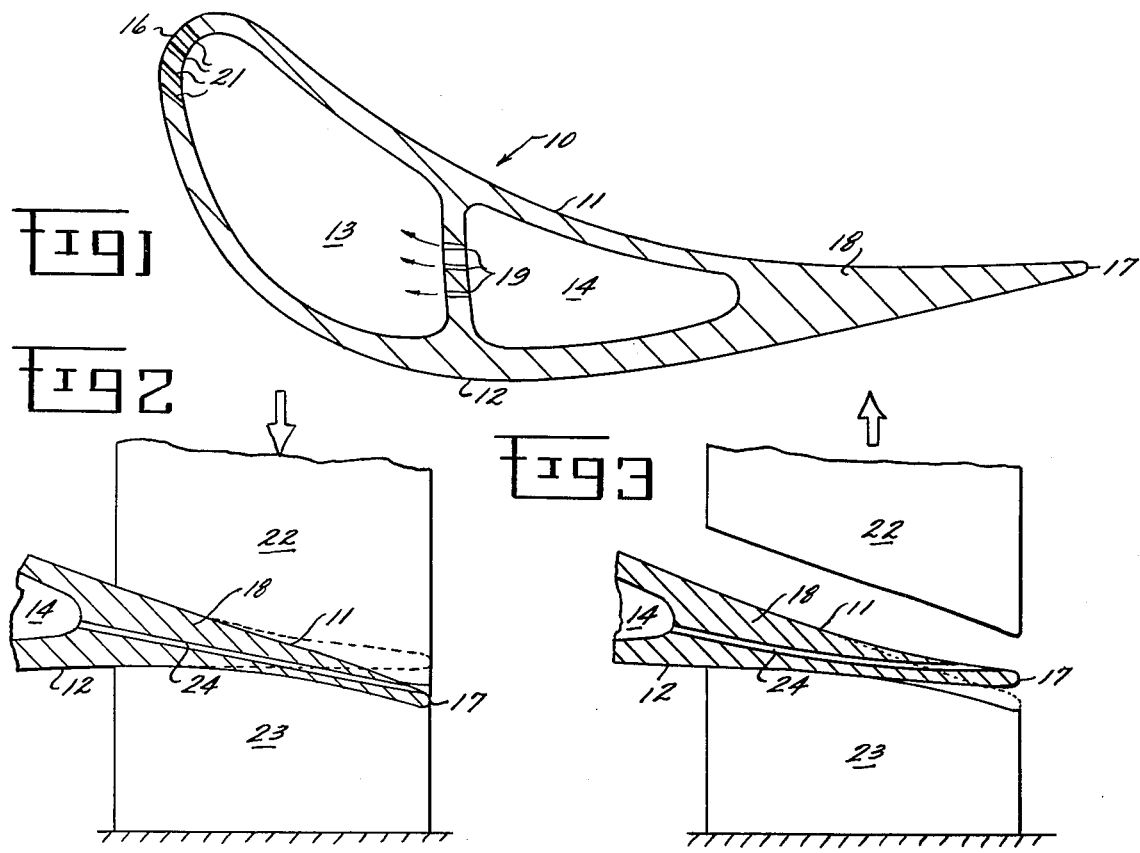
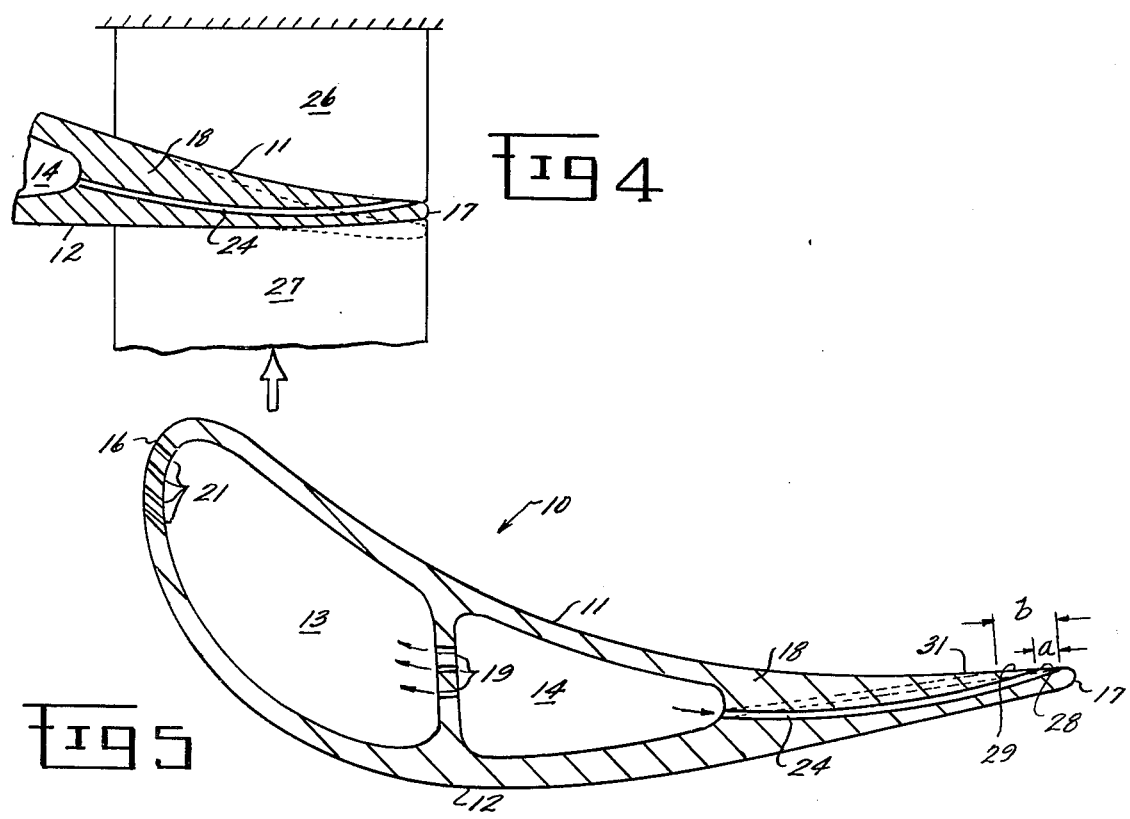

METHOD OF FORMING A CURVED TRAILING EDGE COOLING SLOT

The invention herein described was made in the course of or under a contract, or a subcontract thereunder, with the United States Department of the Air Force.

BACKGROUND OF THE INVENTION

This invention relates generally to turbomachines and, more particularly, to turbine vanes and blades.

In high performance gas turbine engines, the temperature of the hot gas stream which is generated within a combustor section exceeds the operating temperature capability of any practical material from which the turbine blades and vanes may be fabricated. In order to reduce the temperature of the parts to a point where sufficient strength is maintained, it has become an accepted practice to duct lower temperature, pressurized air from the engine compressor to the turbine components which operate in the hot gas stream environment. One of the most effective methods by which the metal temperatures of such components are cooled is to introduce the cooling air into hollow blades or vanes and then discharge the air into the hot gas stream. This cooling air reduces the component metal temperatures through various heat transfer mechanisms such as convective, impingement, or film-cooling action.

To this end, turbine blades and vanes are generally fabricated in the form of a generally hollow shell with a plurality of cavities and associated dividers forming the inner side thereof. However, the trailing edge portion of the airfoil, because of the constraint of aerodynamic efficiencies, tapers down to a very thin trailing edge. Accordingly, since the cavities cannot extend back to the trailing edge, this solid trailing edge portion will heat up to destructive temperatures unless it is cooled in some way. This cooling is commonly accomplished by the forming of a plurality of trailing edge cooling slots which extend between the internal cavities of the airfoil and the trailing edge thereof for the conduction of cooling air therealong.

Historically, cooling slots have been formed to emerge from the trailing edge portion of the airfoil at substantially the centerline thereof. However, it has been found that higher efficiency is accomplished in the performance thereof by ejecting the trailing edge cooling air on the pressure side of the trailing edge. One of the problems of this design is that with a straight slot formed in the trailing edge, the slot break-out length tends to be too long and the break-out point on the pressure side has a large location tolerance. Since the break-out location is critical to the temperature of the vane trailing edge, a stack-up of tolerances can easily result in a slot which does not satisfactorily cool the vane trailing edge.

One method of reducing the location tolerance is to use a curved air slot. Such a curved slot forms a larger angle with the pressure side of the vane and provides better axial location accuracy as a function of vane thickness and slot location tolerances.

In the case of a vane formed by casting, it is relatively easy to form a curved slot. However, very high turbine temperatures necessitate the use of certain types of material which are not adaptable to being cast but are only available in bar form (wrought form). Accordingly, with such noncast airfoils, the cooling holes and slots must be machined into the part in such a manner as by, for example, electrical discharge machining (EDM). One possible method of machining the curved slot by the EDM method is with the use of a curved electrode. However, with the extremely close tolerance conditions, and with the relatively large depth of the slot, such an exercise would be extremely difficult to accomplish.

It is therefore an object of the present invention to provide a noncast airfoil with an improved trailing edge cooling slot.

Another object of the present invention is to provide a trailing edge cooling slot which emerges on the pressure side of the airfoil trailing edge.

Yet another object of the present invention is the provision in the trailing edge cooling slot of a turbine airfoil for the limiting of the slot break-out length and location tolerance.

Yet another object of the present invention is the provision for accurately and effectively forming a curved trailing edge cooling slot in a noncast turbine airfoil.

These objects and other features and advantages become more readily apparent upon reference to the following description when taken in conjunction with the appended drawings.

SUMMARY OF THE INVENTION

Briefly, in accordance with one aspect of the invention, an airfoil is fabricated in its wrought form to substantially the final desired shape except for the trailing edge being slightly uncambered. A straight slot is then formed in the trailing edge portion to connect an internal cavity of the airfoil with a point on the pressure side of the trailing edge. The trailing edge portion of the airfoil is then reformed toward the airfoil pressure side to its final shape, thereby reforming the trailing edge cooling slot to its final curved condition.

By another aspect of the invention, the airfoil may be fabricated to its final shape and elastically deflected toward the suction side of the airfoil and, after the cooling slot is formed therein, be allowed to spring back to its initial position; or, depending on the desired curved shape of the slot and the strength of the vane or blade material after it has been allowed to spring back as possible, it may be finally reformed as required to obtain the proper vane or blade shape.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 shows a transverse cross-sectional view of a turbine airfoil of the type to which the present invention is applicable.

FIG. 2 is a cross-sectional view of the trailing edge portion thereof when deflected to a first position.

FIG. 3 is a cross-sectional view of the trailing edge portion thereof when the deflecting force is removed and the trailing edge is allowed to spring back to a released position.

FIG. 4 is a cross-sectional view of the trailing edge portion thereof when a reforming force is applied to form it into a final shape.

FIG. 5 is a transverse cross-sectional view of the airfoil in its final shape.

DESCRIPTION OF THE PREFERRED EMBODIMENT

Referring now to FIG. 1, there is shown generally at 10 an airfoil representative of the type employed as vanes or blades in the turbine portion of the turbomachine. The airfoil 10 is generally hollow in nature with the curved pressure side 11 and suction side 12 partially defining a plurality of internal cavities 13 and 14. The pressure side 11 and suction side 12 are joined at the leading edge of the airfoil to form a blunt nose 16 and converge toward the rear end of the airfoil to form a very thin trailing edge 17. That tapered portion of the airfoil between the trailing edge 17 and the internal cavities of the airfoil 14 shall for purposes of this description be referred to as the trailing edge portion of the airfoil 18 and it is that portion of the vane to which the present invention is applicable.

Cooling of the airfoil is accomplished by supplying high pressure cooling air from the compressor or the like to the internal cavities 13 and 14 where it acts to lower the temperature of the metal by a combination of convection, impingement and film cooling. Impingement cooling is accomplished by directing cooling air against the inside surface of the airfoil through small internal high velocity air jets as, for example, those coming from holes 19. Convection cooling occurs inside the turbine airfoil cavities 13 and 14 through serpentine paths (not shown). Such convection cooling air eventually exits the airfoil by way of a plurality of holes such as those 21 in the airfoil nose. Once the cooling air has exited the airfoil, then film cooling is accomplished whereby a layer of cooling air is maintained between the high temperature gases and the external surfaces of the airfoil as shown in FIG. 1.

In order to cool the trailing edge portion 18 of the airfoil, it has been common practice to provide a plurality of trailing edge cooling slots between the internal cavity 14 and the trailing edge 17. Cooling air then flows along these slots to provide convection cooling to the trailing edge portion 18 of the airfoil. In order to obtain increased vane or blade aerodynamic efficiency it has been found desirable to eject such air on the pressure side of the trailing edge 17 rather than along the centerline thereof. For reasons discussed hereinabove, it is also advantageous to form the trailing edge cooling slots in a curvilinear shape. The process as described hereinafter is formulated for accomplishing such a design and in particular for use in airfoils of the noncast type (wrought form), wherein machining of the cooling slot is required.

FIG. 2 shows (partially in phantom lines) the trailing edge portion 18 of the airfoil 10 as it appears in FIG. 1. This represents the form in which it was originally fabricated by a noncasting method such as, for example, extrusion or the like. A pair of opposed, preformed dies 22 and 23 are then respectively applied to the pressure and suction sides of the trailing edge portion 18 to deflect that portion to a less cambered position as shown by the solid lines of FIG. 2. While the airfoil is held in such a deflected position, a straight trailing edge cooling slot 24 is formed therein by a suitable method such as for example electrical discharge machining (EDM) with a straight electrode. As can be seen by reference to FIG. 2, it is preferable that the cooling slot emerges on the pressure side 11 of the trailing edge 17 rather than at the centerline of the trailing edge itself.

After the forming of the straight cooling slot, the dies 22 and 23 are released and the trailing edge portion 18 of the airfoil springs back from its deflected position as shown by the dotted lines of FIG. 3 to a more cambered attitude as shown by the solid lines of FIG. 3. As this occurs, the cooling slot 24 will tend to curve in the desired direction as shown in FIG. 3. Depending upon certain design requirements, this form as shown in solid lines in FIG. 3 may be satisfactory for the final design since it does exhibit a curved cooling slot 24. However, if a greater curvature is required, or if the vane profile requires a greater camber for the final design, it is necessary to effect a further step. This is particularly true when the deflection process as shown in FIG. 2 causes the vane material to be stressed beyond its elastic limit such that when the deflecting force is removed as shown in FIG. 3, the trailing edge portion 18 does not spring back to its original position as shown in FIG. 1.

A final step which may be applied is shown in FIG. 4 where preferably a different pair of opposed dies 26 and 27 are applied to the unstressed trailing edge portion 18 to reform it from a position to which it is sprung back (as shown in dotted line) to a final more cambered position as shown in solid lines. As can be seen, the curvature of the slot 24 becomes even greater with this final deflecting process. Where it is desired to have a high degree of curvature of both the trailing edge portion 18 and the cooling slot 24, it may be necessary to form a plurality of successive reformations with intermittent cold work and heat treatment cycles after each of the partial bends so as to prevent cracking of the material along the line of curvature. The required number of such recrystallization steps is, of course, dependent upon the material and the amount of plastic reformation required.

The final profile of the finished airfoil is shown in FIG. 5 with the curvature form of the pressure and suction sides 11 and 12 meeting the predetermined specifications. As a result of the controlled fabrication process described hereinabove, the breakout location 28 of the curved cooling slot 24 is well within the allowed tolerances, and the breakout length as represented by the distance A is small so as to provide a very effective cooling function to the trailing edge 17. Further, it will be recognized that the thin fin 29 created at the pressure side break-out is of sufficient thickness to withstand oxidation which may otherwise cause failure thereof. This is to be contrasted with the straight slot (shown in dotted lines) of the prior art wherein the break-out length is represented by the larger dimension B and wherein the break-out location tolerance is necessarily greater. As mentioned hereinbefore, the break-out location and length are critical to the function of cooling the trailing edge 17. For example, it has been determined empirically that for a particular airfoil design, a reduction of 0.085 inch in the break-out length causes a reduction of 41° F. in the temperature of the trailing edge 17. Further, it will be recognized that the thin fin 31 resulting from the straight slot is much thinner than that 29 of the curved slot and therefore much more susceptible to oxidation and manufacturing tolerances.

It will be understood that while the present invention has been described in terms of a preferred embodiment, it may take on any number of other forms while remaining within the scope and intent of the invention. For example, it will be recognized that the deflection step as shown in FIG. 2 is not necessarily required. That is, the slot forming process may entail only the forming of a straight hole in the airfoil as initially fabricated and then a deforming, by one or a plurality of steps, as shown in FIG. 4 to arrive at the final airfoil shape and curved slot. Further, it will be recognized that the above-described method would apply not only to the slot which emerges on the pressure side of the trailing edge as described herinabove but also to a slot which emerges at the centerline of the trailing edge 17.

Having thus described what is considered novel and desired to be secured by Letters Patent of the United States is:

1. An improved method of forming a cooling air slot between an internal cavity of a turbomachinery airfoil and the trailing edge thereof, wherein the improvement comprises the steps of:
    (a) forming an airfoil to a first shape;
    (b) deflecting the trailing edge portion of the airfoil toward the suction side thereof;
    (c) forming a straight slot which extends between the internal cavity and a point in the trailing portion of the airfoil; and
    (d) forming the airfoil to a final shape by reforming the trailing edge portion thereof toward the pressure side of the airfoil such that said straight slot becomes curved.

2. An improved method of forming a cooling air slot as set forth in claim 1 wherein said slot emerges on the pressure side of said airfoil.

3. An improved method of forming a cooling air slot as set forth in claim 1 wherein the step of final shape forming is performed by a plurality of successive reformations with intermittent heat treatment in between.

4. An improved method of forming a cooling air slot as set forth in claim 1 and including the step of allowing the deflected trailing edge portion to spring back after the forming of a straight slot.

5. An improved method of forming a cooling air slot between an internal cavity of a turbomachinery airfoil and the trailing edge thereof wherein the improvement comprises the steps of:
    (a) deflecting the trailing edge portion of the airfoil toward the suction side thereof;
    (b) forming a straight slot which extends between the internal cavity and a point in the trailing edge of the airfoil; and
    (c) releasing the deflecting force and allowing said trailing edge portion to spring back to an unstressed condition whereby said straight slot becomes curved.

6. An improved method of forming a cooling air slot as set forth in claim 5 wherein said slot emerges on the pressure side of said airfoil.

7. An improved method of forming a cooling air slot as set forth in claim 5 and including a further step of permanently reforming said trailing edge portion toward the pressure side of the airfoil so as to further curve said slot.

8. An improved method of forming a cooling air slot as set forth in claim 7 wherein said permanent reformation step is accomplished by a plurality of successive reformations with intermittent heat treatments of the material.

* * * * *